(12) United States Patent
Brouwer et al.

(10) Patent No.: US 10,151,880 B2
(45) Date of Patent: Dec. 11, 2018

(54) OPTICAL LIGHT GUIDE ELEMENT AND A METHOD FOR MANUFACTURING

(71) Applicant: Anteryon Wafer Optics B.V., Eindhoven (NL)

(72) Inventors: Willem Matthijs Brouwer, Eindhoven (NL); Edwin Maria Wolterink, Eindhoven (NL)

(73) Assignee: Anteryon Wafer Optics B.V., Eindhoven (NL)

( * ) Notice: Subject to any disclaimer, the term of this patent is extended or adjusted under 35 U.S.C. 154(b) by 0 days.

(21) Appl. No.: 15/513,831

(22) PCT Filed: Sep. 23, 2015

(86) PCT No.: PCT/NL2015/050664
§ 371 (c)(1),
(2) Date: Mar. 23, 2017

(87) PCT Pub. No.: WO2016/048150
PCT Pub. Date: Mar. 31, 2016

(65) Prior Publication Data
US 2017/0299810 A1    Oct. 19, 2017

Related U.S. Application Data

(60) Provisional application No. 62/055,160, filed on Sep. 25, 2014.

(30) Foreign Application Priority Data

Sep. 25, 2014   (NL) ...................................... 2013524

(51) Int. Cl.
*G02B 6/12*      (2006.01)
*G02B 6/138*     (2006.01)
(Continued)

(52) U.S. Cl.
CPC ........ *G02B 6/124* (2013.01); *B29D 11/00692* (2013.01); *B29D 11/00721* (2013.01);
(Continued)

(58) Field of Classification Search
CPC ........ G02B 6/124; G02B 6/136; G02B 6/138; G02B 6/4214; G02B 2006/12102;
(Continued)

(56) References Cited

U.S. PATENT DOCUMENTS 5,138,687 A     8/1992   Horie et al.
5,282,080 A *   1/1994   Scifres ............... G02B 6/12007
                                                  359/344
(Continued)

FOREIGN PATENT DOCUMENTS

EP      0209108 A2    1/1987
FR      2569015 A1    2/1986
(Continued)

OTHER PUBLICATIONS

International Search Report and Written Opinion dated Feb. 1, 2016.

*Primary Examiner* — Rhonda S Peace
(74) *Attorney, Agent, or Firm* — Wood, Phillips, Katz, Clark & Mortimer

(57) ABSTRACT

The present invention relates to an optical light guide element having a first end section with a light entrance area designed for facing a light source and having a second end section with a light exit area designed for facing a light target area, wherein the light exit area is defined by a second surface area on the optical light guide element which faces a light target area, and wherein the light entrance area is defined by a first surface area on the optical light guide element which faces the light source, wherein the first end section comprises a first inclined surface area which forms an acute angle with the first surface area of the light entrance
(Continued)

area, wherein the second end section forms a second inclined surface area which encloses an acute angle with the surface area of the light exit area, characterized in that said first surface area on the optical light guide element which faces the light source comprises a first replicated polymer lens.

6 Claims, 16 Drawing Sheets

(51) Int. Cl.
G02B 6/136 (2006.01)
G02B 6/124 (2006.01)
G02B 6/00 (2006.01)
B29D 11/00 (2006.01)

(52) U.S. Cl.
CPC ............... *G02B 6/00* (2013.01); *G02B 6/136* (2013.01); *G02B 6/138* (2013.01); *G02B 2006/12102* (2013.01); *G02B 2006/12104* (2013.01); *G02B 2006/12107* (2013.01)

(58) Field of Classification Search
CPC ........... G02B 2006/12104; G02B 2006/12107; G02B 6/4213; G02B 6/4215
See application file for complete search history.

(56) References Cited

U.S. PATENT DOCUMENTS

| | | | | |
|---|---|---|---|---|
| 6,574,390 B2* | 6/2003 | Kropp | ................ | G02B 6/29368 385/129 |
| 6,804,423 B2* | 10/2004 | Tsukamoto | ............ | G02B 6/138 385/14 |
| 6,810,160 B2* | 10/2004 | Sugama | ............. | G02B 6/12002 385/129 |
| 6,962,667 B2* | 11/2005 | Shimizu | ................. | B29C 31/04 264/1.1 |
| 7,050,691 B2* | 5/2006 | Ishizaki | ............... | G02B 6/1221 264/1.24 |
| 7,366,375 B2* | 4/2008 | Ohtorii | .................... | G02B 6/43 385/129 |
| 7,418,174 B2* | 8/2008 | Hirose | .................. | C03C 25/105 385/49 |
| 7,421,163 B1 | 9/2008 | Tong et al. | | |
| 7,529,439 B2* | 5/2009 | Kim | ...................... | G02B 6/4214 385/14 |
| 8,422,836 B2* | 4/2013 | Riester | ................... | G02B 6/138 385/14 |
| 8,750,658 B2* | 6/2014 | Lee | .................. | B29D 11/00663 385/123 |
| 8,774,576 B2* | 7/2014 | Shiraishi | .................. | G02B 6/42 385/14 |
| 9,513,434 B2* | 12/2016 | Sakai | ..................... | G02B 6/122 |
| 9,519,109 B2* | 12/2016 | Sakai | ................... | G02B 6/4214 |
| 2002/0033547 A1 | 3/2002 | Kloosterboer et al. | | |
| 2002/0118907 A1* | 8/2002 | Sugama | ............ | G02B 6/12002 385/14 |
| 2004/0021237 A1* | 2/2004 | Shimizu | .................. | B29C 31/04 264/1.28 |
| 2004/0126064 A1* | 7/2004 | Vandentop | ............. | G02B 3/005 385/49 |
| 2006/0167875 A1 | 7/2006 | Van Santen et al. | | |
| 2011/0080657 A1* | 4/2011 | Takai | ................... | G02B 6/4206 359/742 |
| 2011/0299808 A1* | 12/2011 | Matsuoka | ............ | G02B 6/4214 385/14 |
| 2012/0176685 A1 | 7/2012 | Sato | | |
| 2014/0295122 A1* | 10/2014 | Riel | .................. | H01L 27/14618 428/54 |

FOREIGN PATENT DOCUMENTS

| | | | |
|---|---|---|---|
| GB | 2289138 A | | 11/1995 |
| JP | 2005010645 A | * | 1/2005 |
| JP | 2006337641 A | | 12/2006 |
| JP | 2008083197 A | * | 4/2008 |
| JP | 2010122576 A | | 6/2010 |
| WO | 2012071674 | | 6/2012 |
| WO | 2013049948 A1 | | 4/2013 |

* cited by examiner

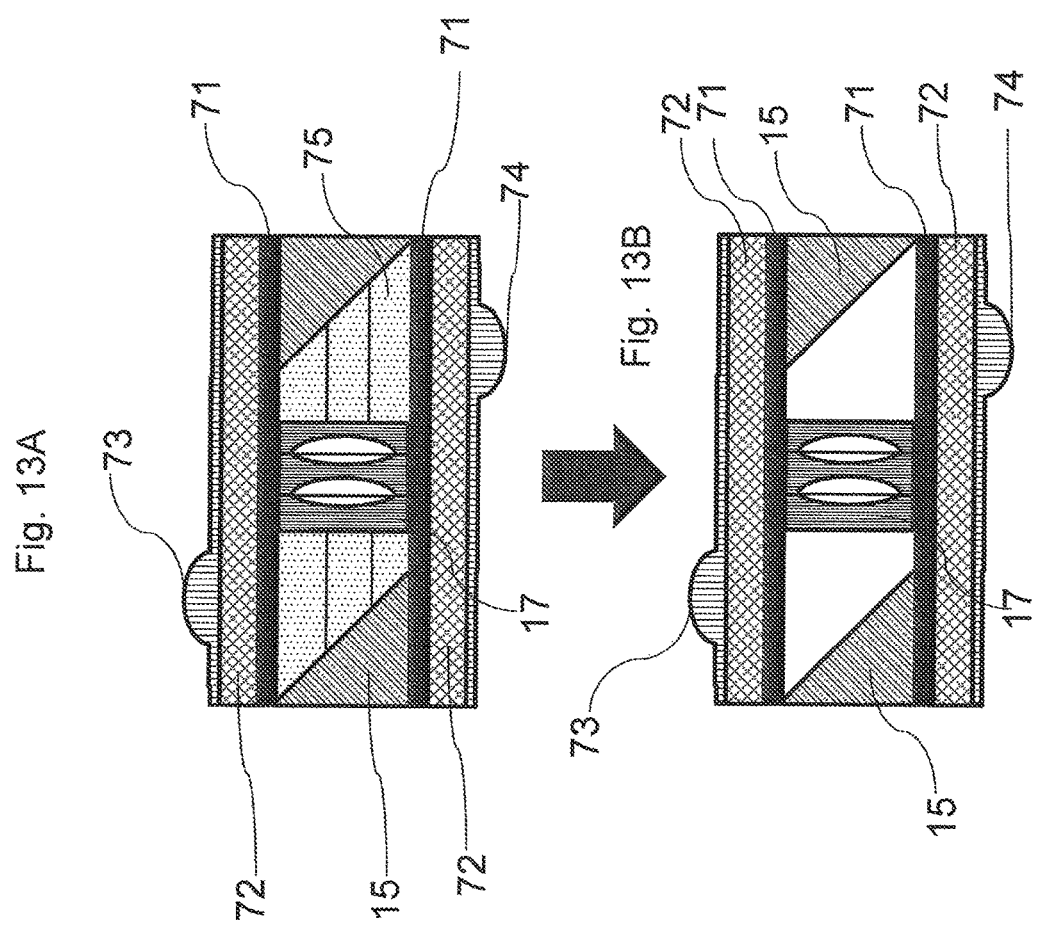

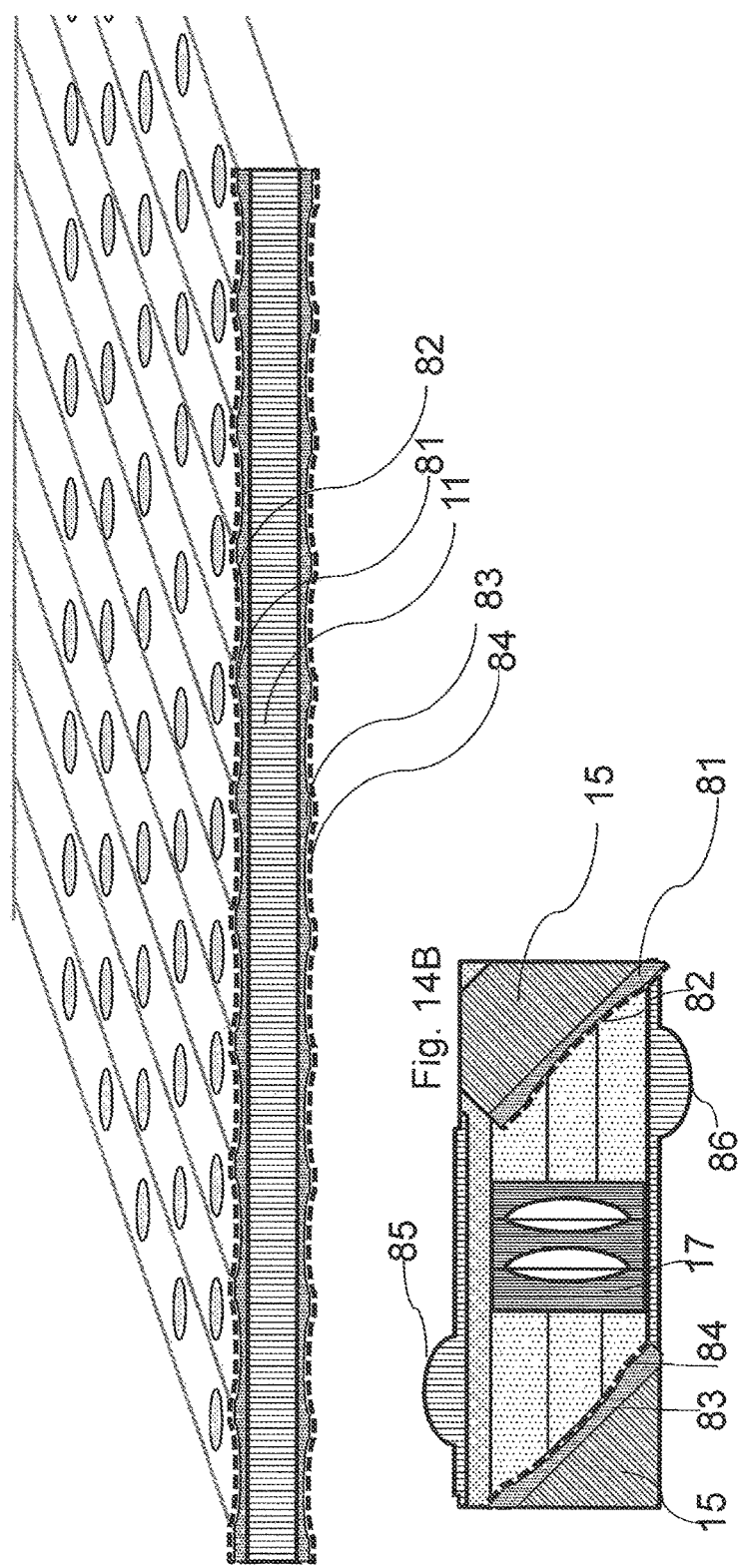

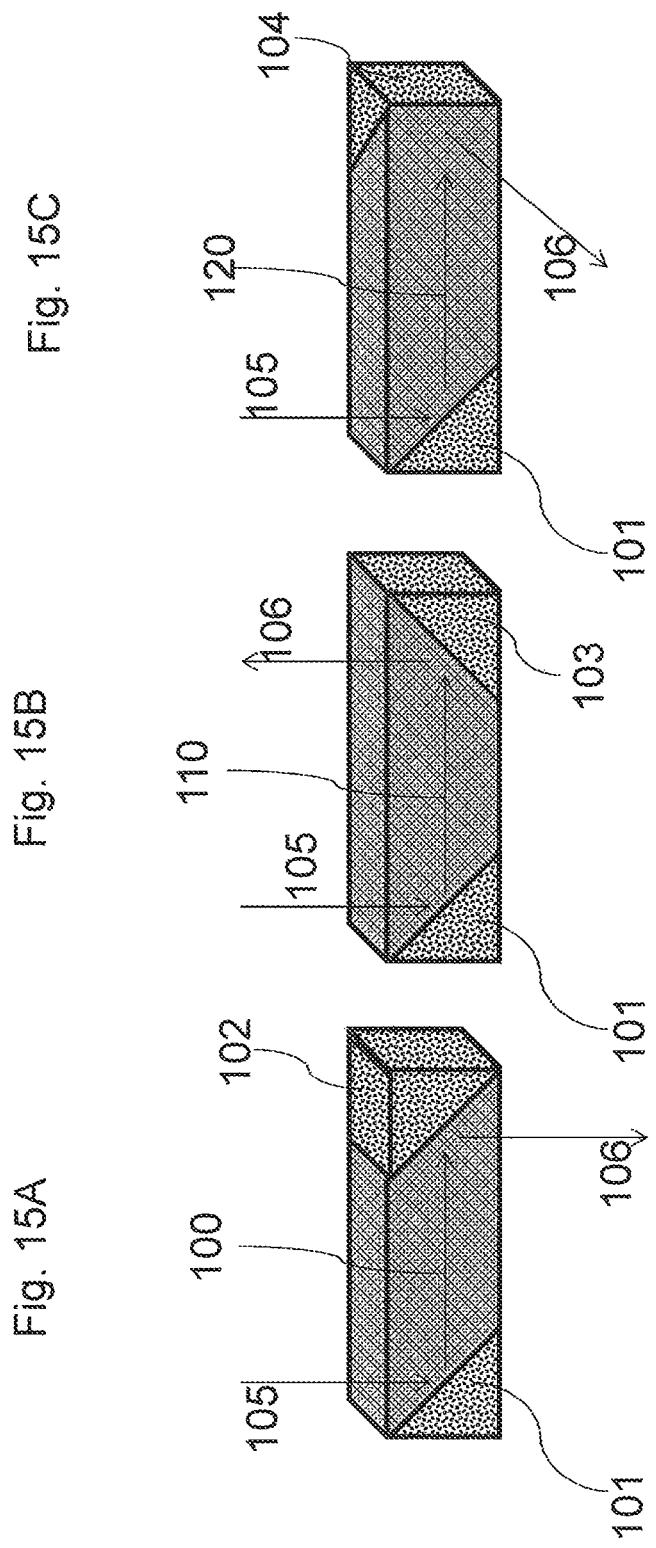

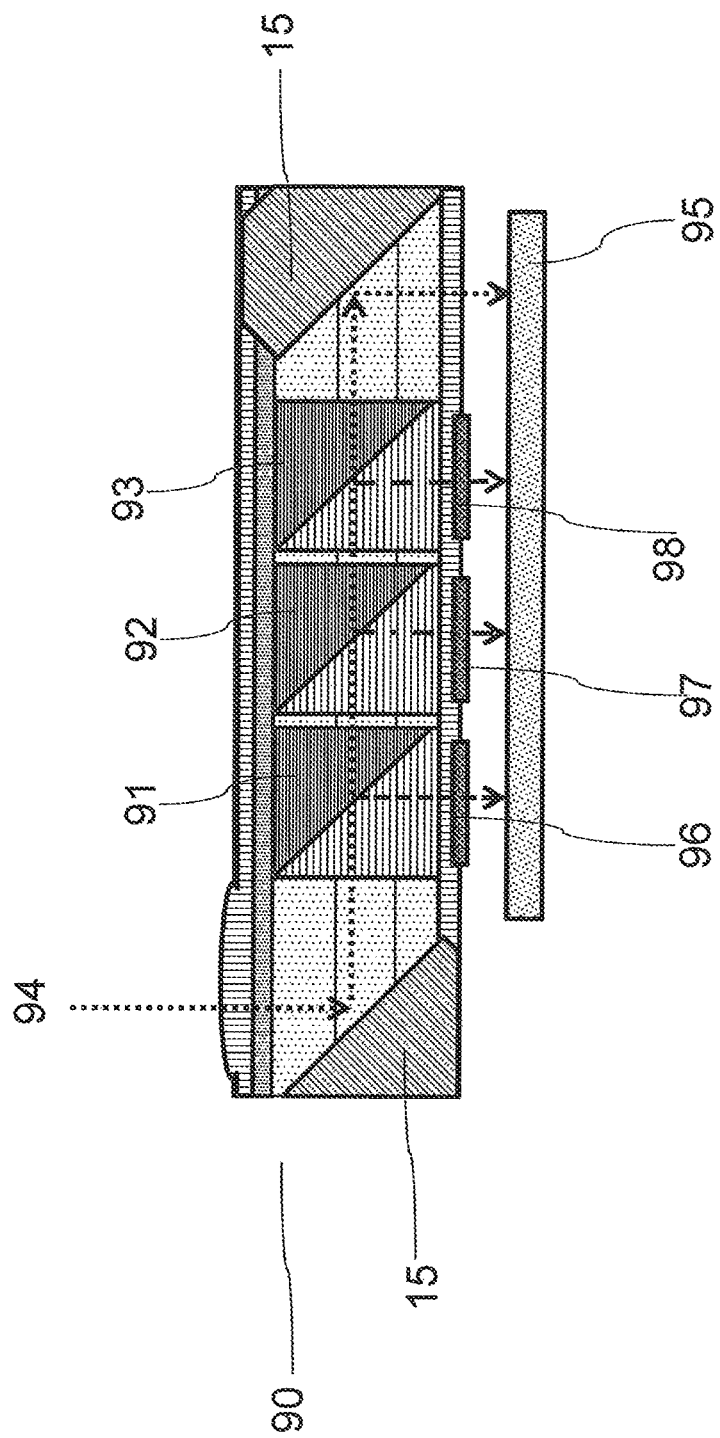

OPTICAL LIGHT GUIDE ELEMENT AND A METHOD FOR MANUFACTURING

CROSS-REFERENCE TO RELATED APPLICATIONS

This application claims priority of Provisional Ser. No. 62/055,160, filed Sep. 25, 2014, Netherlands Appln. No. 2013524, filed Sep. 25, 2014 and Appln. No. PCT/NL2015/050664, filed Sep. 23, 2015, the disclosures of which are hereby incorporated by reference in their entirety.

FIELD OF THE INVENTION

The present invention relates to an optical light guide element and a method for manufacturing an optical light guide element.

BACKGROUND OF THE INVENTION

Such an optical light guide element is known form International application WO 2012/071674. This International application relates to an optical light guide element having a first end section with a light entrance area designed for facing a light source and having a second end section with a light exit area designed for facing a light target area, wherein the light entrance area is defined by a surface area on the optical light guide element which faces the light source and wherein the first end section comprises an inclined surface area which forms an acute angle with the surface area of the light entrance area.

JP2006337641 relates to a method for producing prisms having high angular accuracy wherein a laminated glass is obtained by bonding small and large substrates orderly. Subsequently, the glass laminate is cut into several pieces and double side polishing is carried out, wherein the cut glass pieces are divided into short strips by cutting at intervals more than the length of prism in orthogonal to the polishing surface. The short strips are polished along the cut surface with respect to the reference plane and strips are again cut at equal spacing in orthogonal to the polishing surface of double side polishing or short strip polishing.

JP 2010-122576 relates to a method for manufacturing an optical element having at least one optical thin film having a predetermined optical function inside the element, wherein the method includes a laminate joined body-forming step of laminating a plurality of sheets of parallel planar optical components so that the optical thin film and an adhesive are interposed between the components to form a laminate joined body.

WO2013049948 relates to a method for manufacturing an optical element, comprising the steps of providing a wafer comprising a multitude of semi-finished objects, separating said wafer into parts referred to as sub-wafers comprising a plurality of said semi-finished objects, processing at least a portion of said plurality of semi-finished objects by subjecting said at least one sub-wafer to at least one processing step. A light guide element is manufactured starting from a blank transparent glass or polymer wafer which is on both sides provided with a coating such as a sputtered aluminium reflective coating which then is selectively etched using lithography for forming transparent light entrance areas. This light guide element is a part of the final optical path and should therefore be transparent. The wafer according to WO2013049948 comprises a multitude of semi-finished products obtained involving carrying out, e.g., one or more of lithographic processes, replication processes, coating processes, mechanical processes, etching processes, polishing processes and/or others. The wafer is divided into sub-wafers, e.g., by punching, sawing, cutting, or laser cutting, a sub-wafer comprising one or more, usually a plurality of said semi finished products. Then the sub-wafers are processed, wherein the processing may comprise one or more of lithographic processes, replication processes, coating processes, mechanical processes, etching processes, polishing processes and/or others. Then, the processed one or more sub-wafers are separated into a multitude of objects. The so-obtained objects may be used as obtained or may be subjected to further processing, e.g., to a packaging process or to a mounting process in which the object is mounted to another element or device. Polishing steps of optical surfaces may result in damaged optical surfaces.

Such is for example known from US 2012/0176685. US application 2012/0176685 relates to a refractive, variable magnification optical system including, sequentially from a side nearest an object, a first lens group having a positive refractive power; a second lens group having a negative refractive power; a third lens group having a positive refractive power; and a fourth lens group having a positive refractive power. In addition, the first lens group includes sequentially from the side nearest the object, a negative meniscus lens having a convex surface facing toward the object, a prism that refracts an optical path, a plano-convex lens, and a biconvex lens, a light transmitting surface of the prism and the planoconvex lens being cemented.

Although US 2012/0176685 teaches a demand for smaller imaging apparatuses and smaller imaging lenses mounted to the imaging apparatuses, the solution provided by this document, i.e. a refractive optical system that disposes in the optical path, a prism that refracts the optical path, thereby enabling a reduction in a dimension of depth (thickness) of the optical system, does not provide a substantial reduction of the thickness of the imaging device while maintaining high optical performances, such as wider fields of view and higher resolution.

JP2008083197 relates to a method for producing a planar optical waveguide having a first cladding layer of one or both the lens structure and the second cladding layer, wherein the optical waveguide is suitably used as such a light coupling member in an optical interconnection which has a light source such as a VCSEL.

JP2005010645 relates to process for the preparation of the optical waveguide film, in particular to a method for producing optical waveguide film to be used for optical interconnection.

U.S. Pat. No. 7,421,163 relates to free space optical communications, in particular to free space optical detection with large field of view for use in optical communication systems.

FR 2 569 015 relates to a duplexer which optically couples a first, light-emitting optoelectronic component and an optical fibre acting as a receiver and the coupling of the said optical fibre, acting as an emitter, and a second, light-receiving optoelectronic component.

GB 2 289 138 relates to a multiple light path apparatus for a wireless optical communication system wherein at least a reflective layer (RL) within a lens forms an entry or end portion for a beam waveguide said layer (RL) forming an angle with the optical axis of the lens.

EP 0 209 108 relates to an optical element comprising at least two parts joined together, wherein the joining surface has an inclination to the optical axis and a beam splitter film transmits that caused by their reflection/transmission characteristic, a pitch and or collection of optical beams, wherein at least one of the boundary surfaces of the optical element comprises a converging or diverging optical effect.

U.S. Pat. No. 5,138,687 relates to a rib optical waveguide and an optical waveguide layer device including an optical waveguide layer or film on which a grating, a waveguide lens, etc. are formed and to a method of manufacturing the rib optical waveguide, the optical waveguide devices, and the optical waveguide layer devices by use with liquid materials which are solidified through an energy irradiation of ultraviolet ray and the like.

Many mobile devices, such as mobile phones and tablet computing devices include cameras that may be operated by a user to capture still and/or video images. Because the mobile devices are typically designed to be relatively small, it can be important to design the cameras or imaging systems to be as thin as possible in order to maintain a low-profile mobile device. In various conventional devices, the thickness of the mobile device is maintained as small as possible by turning either the image sensor or the lens group on its side and using reflective devices to bend the rays to the sensor. It is also possible to maintain the thickness of the mobile device as small as possible by shortening the focal length of the imaging system.

In addition, slanted optical surfaces on mirrors, prisms, beam splitters and in periscopic systems are used for light beam deflection, reflection and beam splitting at 90 degrees (45 deg slope) in e.g. interferometry and encoders. At a much smaller scale (features sizes far below 500 micron) similar structures can be found in displays and planar optics embedded on silicon substrates' for telecom applications.

Folded optics and similar periscopic optical systems are also increasingly used for imaging and light guide applications in mobile imaging, optical sensors and other consumer applications. Because the devices are becoming thinner, folded optics becomes in many case the only solutions for decreasing the size of the camera optics; the height in particular. For instance, diameters lenses or light guides are shrinking from 5 mm towards 1 mm. The present inventors found that assembly and precise alignment of slanted optics at these small dimensions becomes cumbersome, slow and very expensive.

SUMMARY OF THE INVENTION

An object of the present invention is to provide a method for manufacturing optical light guide elements, in which method additional steps of polishing optical surfaces is minimized.

Another object of the present invention is to provide a method for manufacturing optical light guide elements, wherein the dimensions of the optical light guide elements is maintained as small as possible without deteriorating its optical performances.

Another object of the present invention is to provide a method for manufacturing optical light guide elements enabling precise alignment of slanted optics.

Another object of the present invention is to provide a method for manufacturing optical light guide elements by assembling multiple small slanted surfaces wherein the absolute and mutual control of position and angle is controlled and maintained.

The present invention thus relates to an optical light guide element having a first end section with a light entrance area designed for facing a light source and having a second end section with a light exit area designed for facing a light target area, wherein the light exit area is defined by a second surface area on the optical light guide element which faces a light target area, and wherein the light entrance area is defined by a first surface area on the optical light guide element which faces the light source, wherein the first end section comprises a first inclined surface area which forms an acute angle with the first surface area of the light entrance area, wherein the second end section forms a second inclined surface area which encloses an acute angle with the surface area of the light exit area, characterized in that said first surface area on the optical light guide element which faces the light source comprises a first replicated polymer lens, said first inclined surface area and said second inclined surface area both comprise a substrate provided with a reflective surface.

The present inventors found that by using such optical light guide element one or more of the above identified objects can be achieved. The optical light guide element according to the present invention has a first end section with a light entrance area designed for facing a light source through which light passes, i.e. visible or near-visible range of electromagnetic wave range, e.g. near infrared (IR) or ultraviolet (UV) light. Further, the optical light guide element has a second end section with a light exit area designed for facing a light target area, particularly a light sensor, i.e. an opto-electronic sensor. The first end section forms an inclined surface area which forms an acute angle with said surface area of the light entrance area. The inclined resp. slanted surface area is preferably inclined in a direction parallel to the main direction of the light propagation within the light guide element. The main direction of the light propagation within the light guide element is defined by a starting point in the first end section and an end point in the second end section.

The terms "light source" and "light target area" have been used here for clarification purposes only. The use of these terms provides an explanation of the optical path within the present optical light guide element.

The term "replicated" refers to a replica technology. For example US2002033547 and US2006157875 both relate to a method of manufacturing a replica. A replica technology as applied here refers to the provision of a curable or polymerizable resin or monomer composition between a mould and a substrate or a blank, carrying out a UV light-initiated or thermal curing treatment and removing the mould for obtaining a replica thus manufactured.

The acute angle between the inclined surface area and the surface area of the light entrance area is between at minimum 10° and at maximum 80°. The location and dimension of the light entrance area, the location and dimension of the inclined surface of the first end section and the acute angle between the inclined surface and the light entrance are such that at least some, preferably most of the incoming light is reflected on the inclined surface within the optical light guide element. Once the light has entered the light guide element and e.g. has been reflected by the inclined surface for the first time, it propagates from the first end section towards the second end section of the light guide element. The described inclined surface now has the effect that the incoming light, which is reflected on the inclined surface, receives a distinct component of propagation in direction of the second end section. Hence, light which impinges the light guide element in a steep angle and particularly perpendicularly to the light entrance area, resp. in a steep angle and particularly perpendicular to the main direction of the light propagation within the light guide element is redirected in a direction having a component of propagation in direction of the second end section.

According to a preferred embodiment the second surface area on the optical light guide element which faces a light target area comprises a second replicated polymer lens.

In another preferred embodiment one or more optical elements are positioned in the main direction of light propagation within the optical light guide element. Such optical elements are preferably chosen from the group of lenses, infra red filter, diaphragm, aperture, beam splitter, polarizer and dichroic filter.

In a preferred embodiment of the present optical light guide element the first replicated lens is of the concave or convex shape.

In a preferred embodiment of the present optical light guide element the second replicated lens is of the concave or convex shape.

In another preferred embodiment of the present optical light guide element the second surface on the optical light guide element comprises one or more grating elements.

The first inclined surface area comprises preferably a glass substrate provided with a reflective surface.

In addition in the present optical light guide element the second inclined surface area comprises preferably a glass substrate provided with a reflective surface.

The present invention is not restricted to a particular substrate material and any transparent or non transparent material that can be made reflective by providing a reflective coating (Physical Vapour Deposition or Chemical Vapour Deposition techniques) or by polishing can be used as such a substrate. In the present optical light guide element both the second inclined surface area and the first inclined surface area are preferably provided with a reflective surface that does not transmit light rays, unlike beam splitters that have been provided with semi transparent mirror coatings.

The volume between the first end section and the second end section preferably comprises a cured transparent polymer. In addition the first and/or second surface of the present optical light guide element may preferably comprise cured polymer. The volume between the first end section and the second end section may also comprise only air, i.e. no solid transparent material.

In a preferred embodiment of the present optical light guide element the material for the first replicated polymer lens and the second replicated polymer lens are the same, namely preferably UV curable polymer. It is however noted that other curing mechanisms may be used, such as electron beam curing and thermal curing, or combinations thereof. These types of curing mechanisms apply for all polymer materials as discussed in this description.

In another preferred embodiment of the present optical light guide element the material for the first and second replicated polymer lens differs from the cured transparent polymer material used for the volume between said first end section and said second end section.

The present invention also relates to a method for manufacturing an optical light guide element as discussed above, the method comprising the steps of:

i) providing a first mould provided with a first mould surface having a plurality of lens shapes and recesses;

ii) providing a first liquid curable polymer on top of said first mould surface of said first mould;

iii) providing a second mould provided with a second mould surface having a plurality of ribs;

iv) contacting said first mould with said second mould such that the first liquid curable polymer spreads into the plurality of lens shapes and recesses and that said ribs of said second mould fit into said recesses of said first mould;

v) curing said first liquid curable polymer for obtaining a first mould provided with a layer of cured first polymer, and removing said second mould;

vi) positioning a plurality of optical elements into said recesses of said first mould provided with a layer of cured first polymer;

vii) providing a second liquid curable polymer in the area between said positioned optical elements;

viii) curing said second liquid curable polymer;

ix) providing a third liquid curable polymer on top of said layer of cured second polymer;

x) contacting said third liquid curable polymer with a third mould provided with a third mould surface having a plurality of lens shapes and recesses;

xi) curing said third liquid curable polymer and removing said first and third mould for obtaining an array of optical light guide elements; and xii) singulating said array of optical light guide elements.

According to another embodiment of the present method an additional step is carried out before contacting said third liquid curable polymer with said third mould. Such an additional step comprises the preparation of a third mould, comprising providing a third mould provided with a third mould surface having a plurality of lens shapes and recesses, providing a fourth liquid curable polymer on top of said third mould surface of said third mould, providing a second mould provided with a second mould surface having a plurality of ribs, and contacting said third mould with said second mould such that the fourth liquid curable polymer spreads into the plurality of lens shapes and recesses and that said ribs of said second mould fit into said recesses of said third mould, and removing said second mould.

In a preferred embodiment a step of placing a foil is carried out between step iii) and iv). Such an additional step comprises a step of placing a foil between said second mould surface having a plurality of ribs of said second mould and said first liquid curable polymer on top of said first mould surface of said first mould. Such a foil is preferably a transparent foil.

The step vi) of the present method further comprises positioning one or more optical elements onto said layer of cured first polymer between said plurality of optical light guide elements, wherein said one or more optical elements are chosen from the group of lenses, infra red filter, diaphragm, aperture, beam splitter, polarizer and dichroic filter.

In a preferred embodiment step vii) further comprises the gradual provision of said second liquid curable polymer in the area between said positioned optical elements, wherein the gradual provision preferably comprises the application of a layer of second liquid curable polymer and partially curing said second polymer and the application of one or more additional layers of second liquid curable polymer and partially curing the same. In a preferred embodiment such a process of polymerisation is replaced by a dispensing method, a jetting method or 3D printing method.

BRIEF DESCRIPTION OF THE DRAWINGS

Various aspects of the present invention are illustrated by way of example, and not by way of limitation, in the accompanying drawings, wherein:

FIG. 13 shows another step of the present method for manufacturing an optical light guide element;

FIG. 14 shows another step of the present method for manufacturing an optical light guide element;

FIG. 15 shows another step of the present method for manufacturing an optical light guide element;

FIG. 16 shows another step of the present method for manufacturing an optical light guide element.

The identical parts are provided with the same reference symbols in the figures.

DETAILED DESCRIPTION OF THE PREFERRED EMBODIMENT

Figure 1:
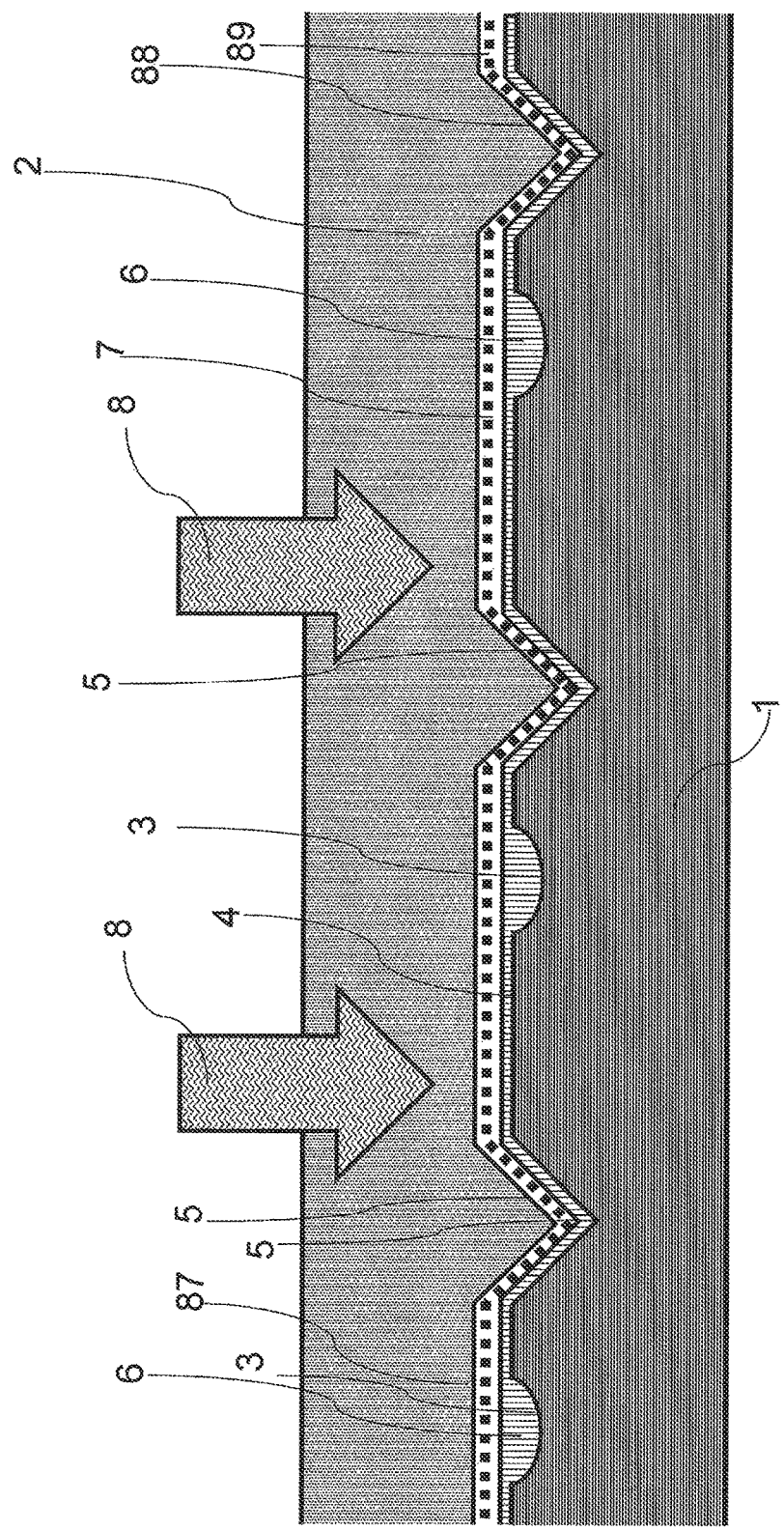
FIG. 1 shows a step of the present method for manufacturing an optical light guide element.

The first step of the present method for manufacturing an optical light guide element can be seen as a step of pre-fill mould with lens and positioning features. FIG. 1 shows a first mould 1 provided with a first mould surface 4 having a plurality of lens shapes 3 and recesses 5. These lens shapes can have different shapes, such as concave and convex. The mould 1 is not restricted to a specific shape of lens 3. In a first step a first liquid curable polymer 6 is applied on top of first mould surface 4 of first mould 1. In a next step a second mould 2 provided with a second mould surface 87 having a plurality of ribs 88 is brought into contact with the first mould 1. Mould 2 is transparent to light and the first liquid curable polymer 6 is cured by energy 8, for example UV curing, electron beam curing and thermal curing. The step of contacting is carried out such that the first liquid curable polymer 6 spreads into the plurality of lens shapes 3 and recesses 5 and those ribs of second mould 2 fit into recesses 5 of first mould 1. After the step of curing the first liquid curable polymer 6 first mould 1 is provided with a layer of cured first polymer. The second mould 2 can now be removed without damaging the layer of cured first polymer. FIG. 1. also shows the application of a foil 89. The application of such a foil encompasses a preferred embodiment because several polymerization processes will result in more even polymer constructions when using such a foil 89.

Figure 2:
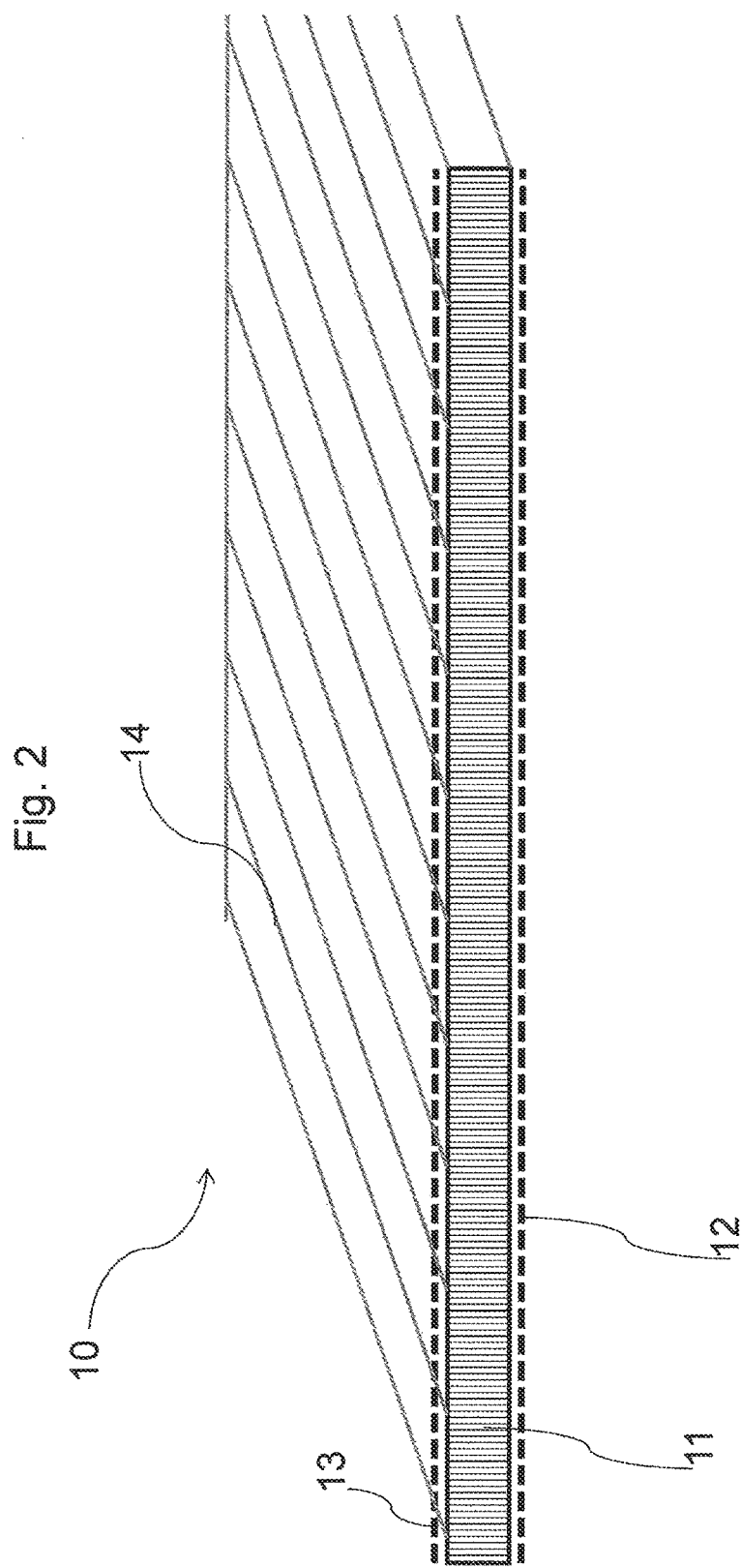
FIG. 2 shows another step of the present method for manufacturing an optical light guide element.

FIG. 2 shows a step of manufacturing reflective elements. A substrate 1 for example made of glass, is provided on each side with a reflective coating 12, 13. FIG. 2 also shows dicing lines 14 for obtaining individual reflective elements, i.e. optical mirror elements (see FIG. 3).

Figure 3:
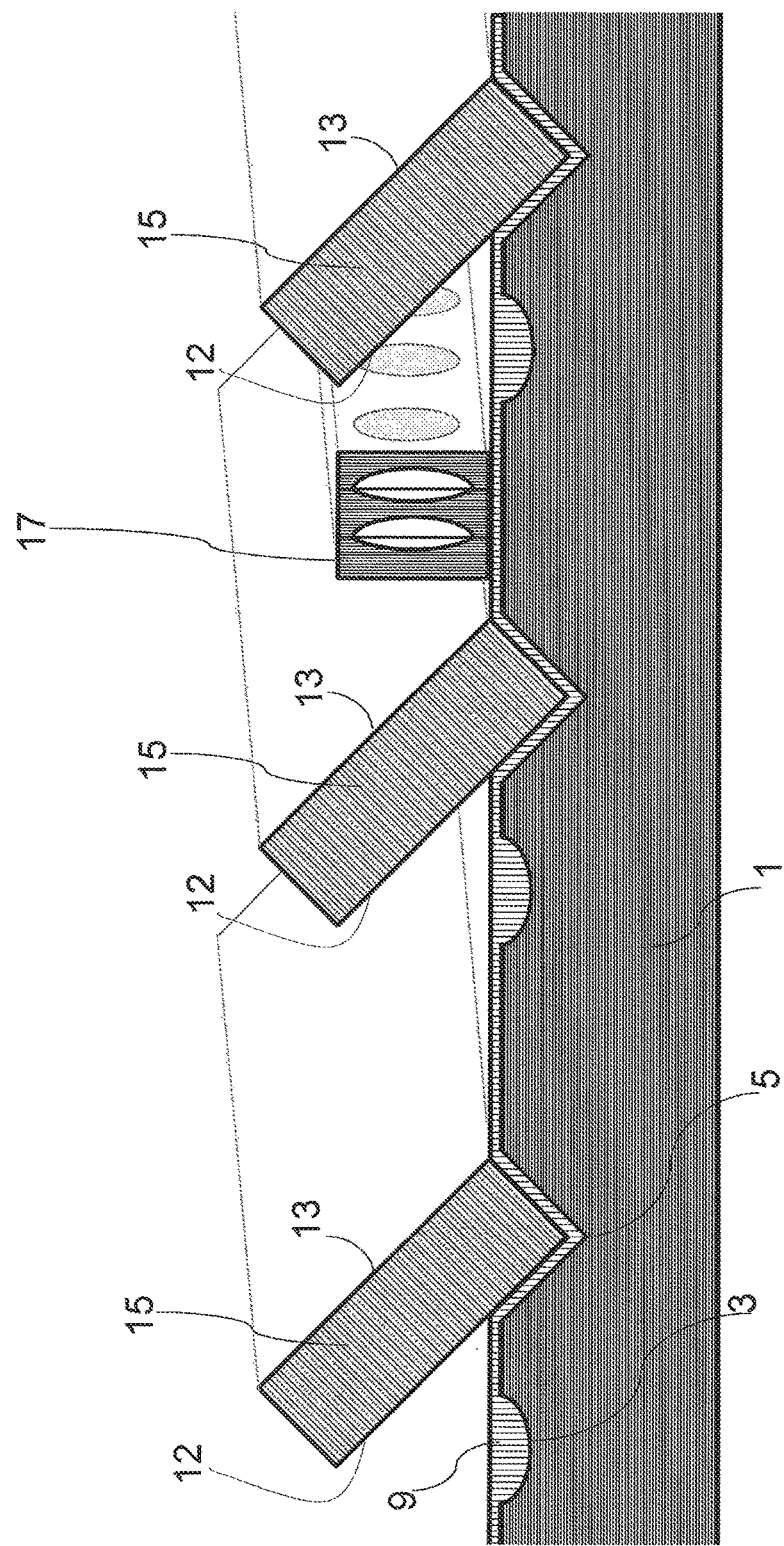
FIG. 3 shows a step of the present method for manufacturing an optical light guide element.

FIG. 3 shows the positioning of optical features, such as optical mirror elements 15, for example manufactured according to FIG. 2. According to FIG. 3 a plurality of optical mirror elements 15 is positioned into the recesses 5 of first mould 1 provided with a layer of cured first polymer 9. Although recesses 5 show a rectangular shape, different shapes and angles are possible. FIG. 3 also shows the positioning of an optical element 17 on top of the layer of cured first polymer 9. The number and function of optical elements 17 is not restricted and the optical element can be chosen from the group of lenses, infra red filter, diaphragm, aperture, beam splitter and XX, or a combination thereof.

Figure 4:
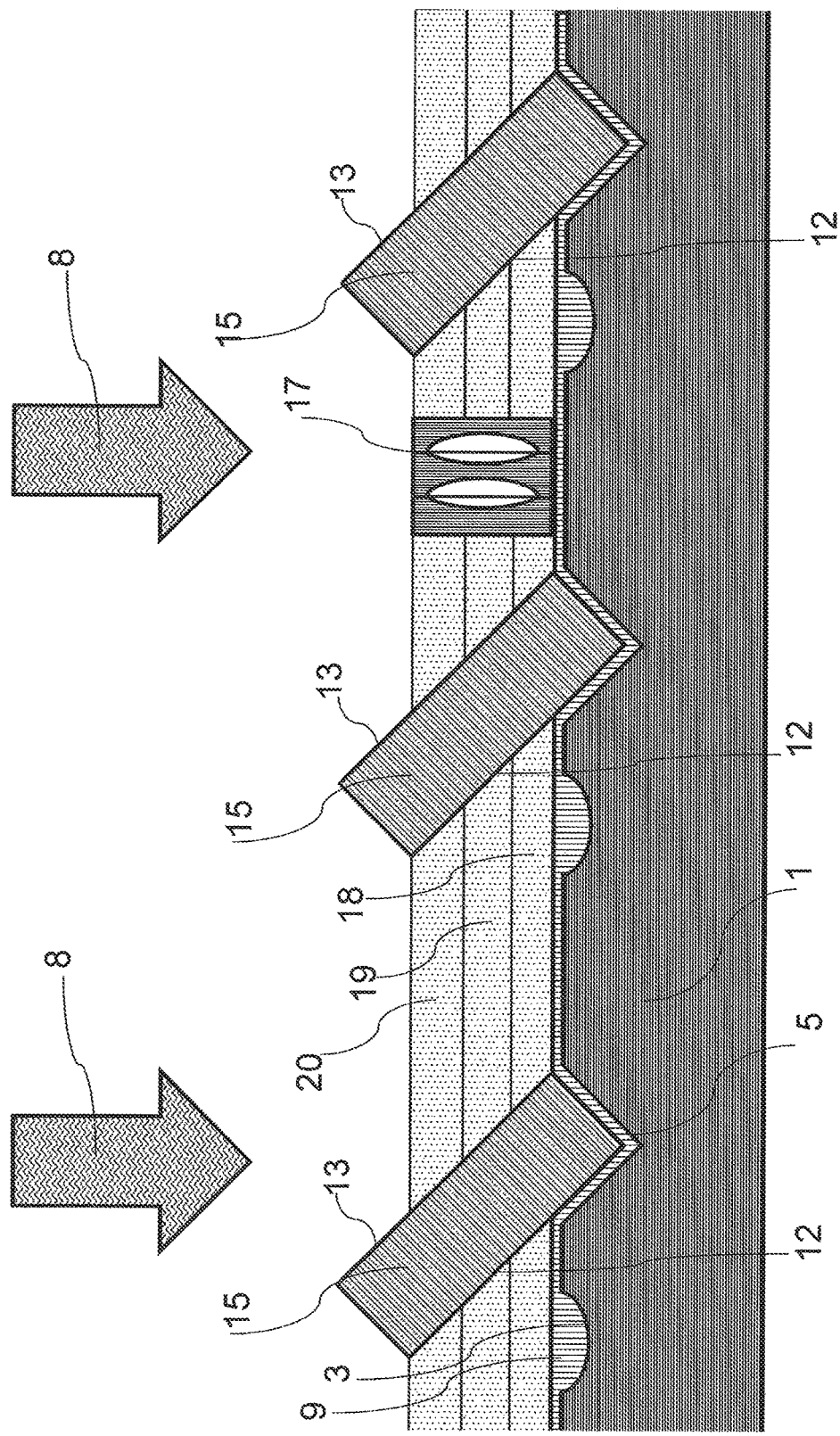
FIG. 4 shows another step of the present method for manufacturing an optical light guide element.

A next step, as shown in FIG. 4, is the provision of a second liquid curable polymer 18, 19, 20 in the area between the optical mirror elements 15 and optical elements 15, as discussed before. As shown here, the second liquid curable polymer 18, 19, 20 is provided as a three layer polymer, wherein in a first step second liquid curable polymer 18 is applied and cured (via energy 8), followed by the application of second liquid curable polymer 19. This second liquid curable polymer 19 is subsequently cured and another second liquid curable polymer 20 is applied and cured. The present method is not restricted to any specific number of layers of second liquid curable polymer but, from the viewpoint of shrinkage, it is preferred to apply second liquid curable polymer in at least two layers with intermediate curing. In addition it is also preferred to under cure, i.e. not fully cure, the second liquid curable polymer for preventing the formation of interfaces between the individual layers of second liquid curable polymer. The result of the application of second liquid curable polymer is that the optical elements, i.e. the optical mirror elements 15 and the optical element 17, are embedded by the second cured polymer.

Figure 5:
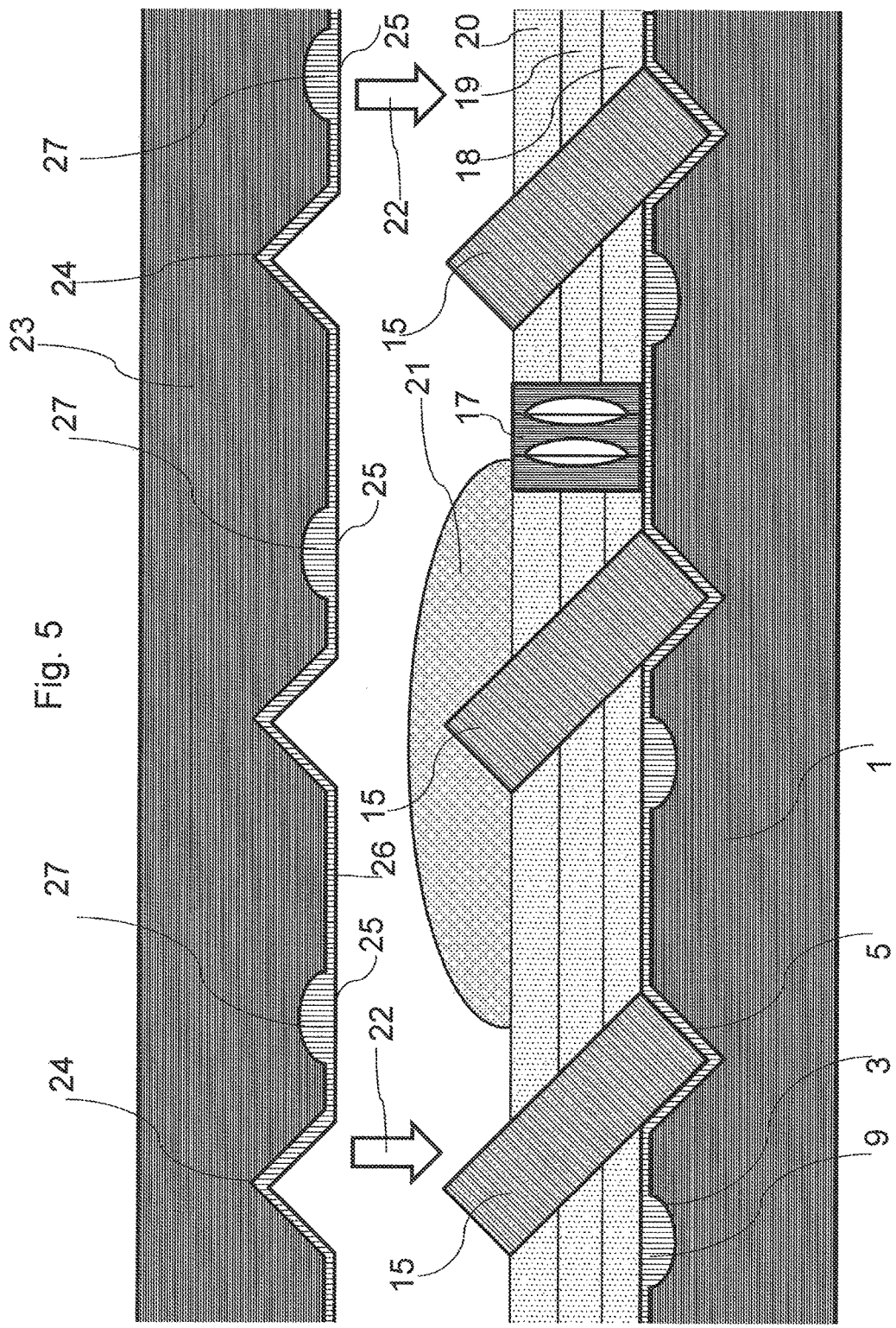
FIG. 5 shows another step of the present method for manufacturing an optical light guide element.

A next step, as shown in FIG. 5, relates to the application of a providing a third liquid curable polymer 21 on top of the layer of cured second polymer. FIG. 5 clearly shows that optical mirror elements 15 and the optical element 17 are fixed on the first layer of cured polymer 9 and embedded by the second cured polymer. FIG. 5 also shows a third mould 23 provided with recesses 24 and lenses 25, wherein both the recesses 24 and lenses 25 are provided with a layer of cured polymer 27. The third mould 23 is brought into contact (see the direction of movement, i.e. arrows 22) with the layer of third liquid curable polymer 21. The third liquid curable polymer 21 will flow into the recesses 24 of third mould 23. The shape and angle of recesses 24 of third mould 23 will match with the shape and angle of optical mirror elements 15 of first mould 1.

Figure 6:
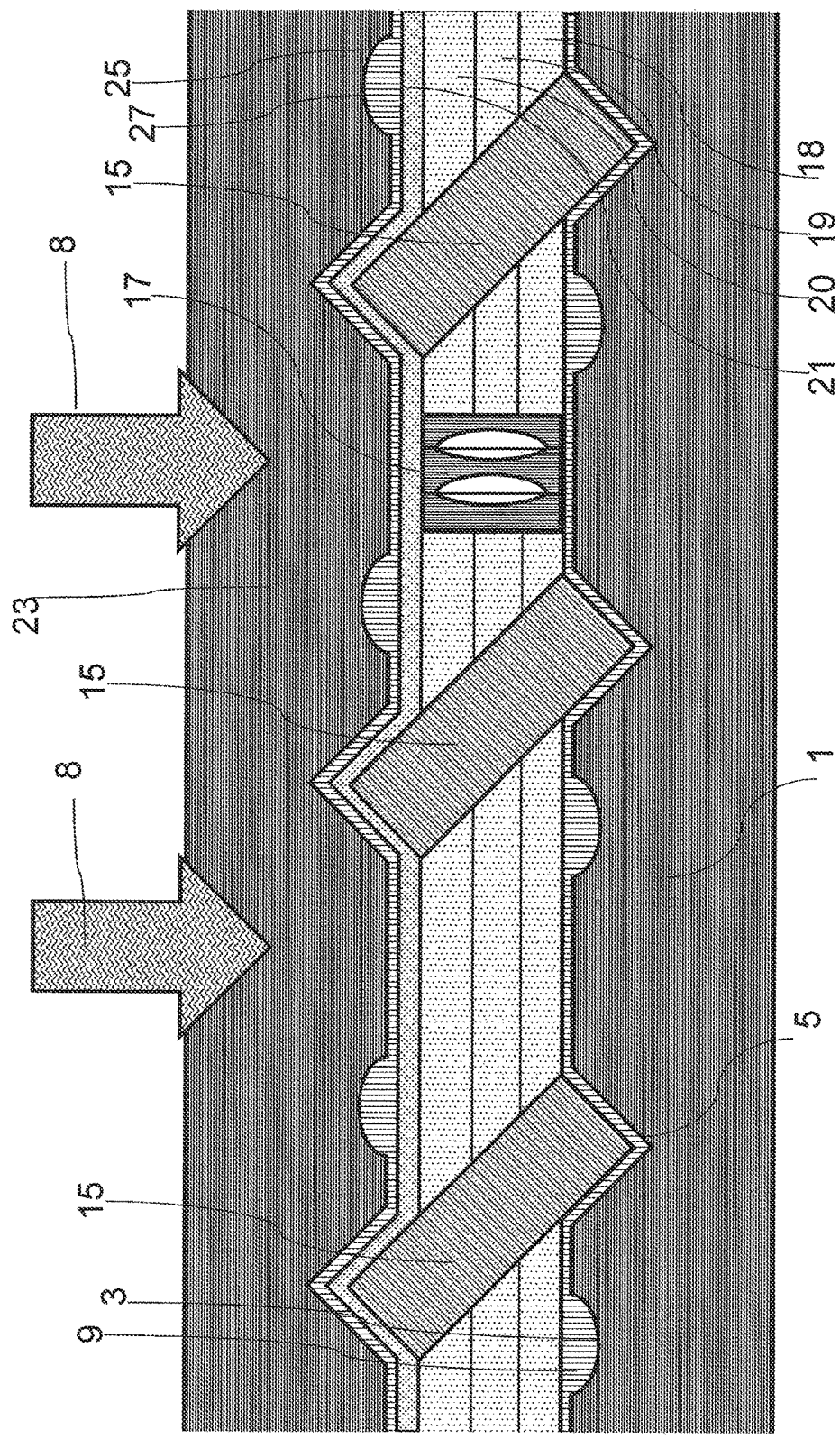
FIG. 6 shows another step of the present method for manufacturing an optical light guide element.

In FIG. 6 the third liquid curable polymer 21 is spread by pressing third mould 23 onto first mould 1 and subsequently cured by energy 8. The result is the formation of a layer of third cured polymer 21.

Figure 7:
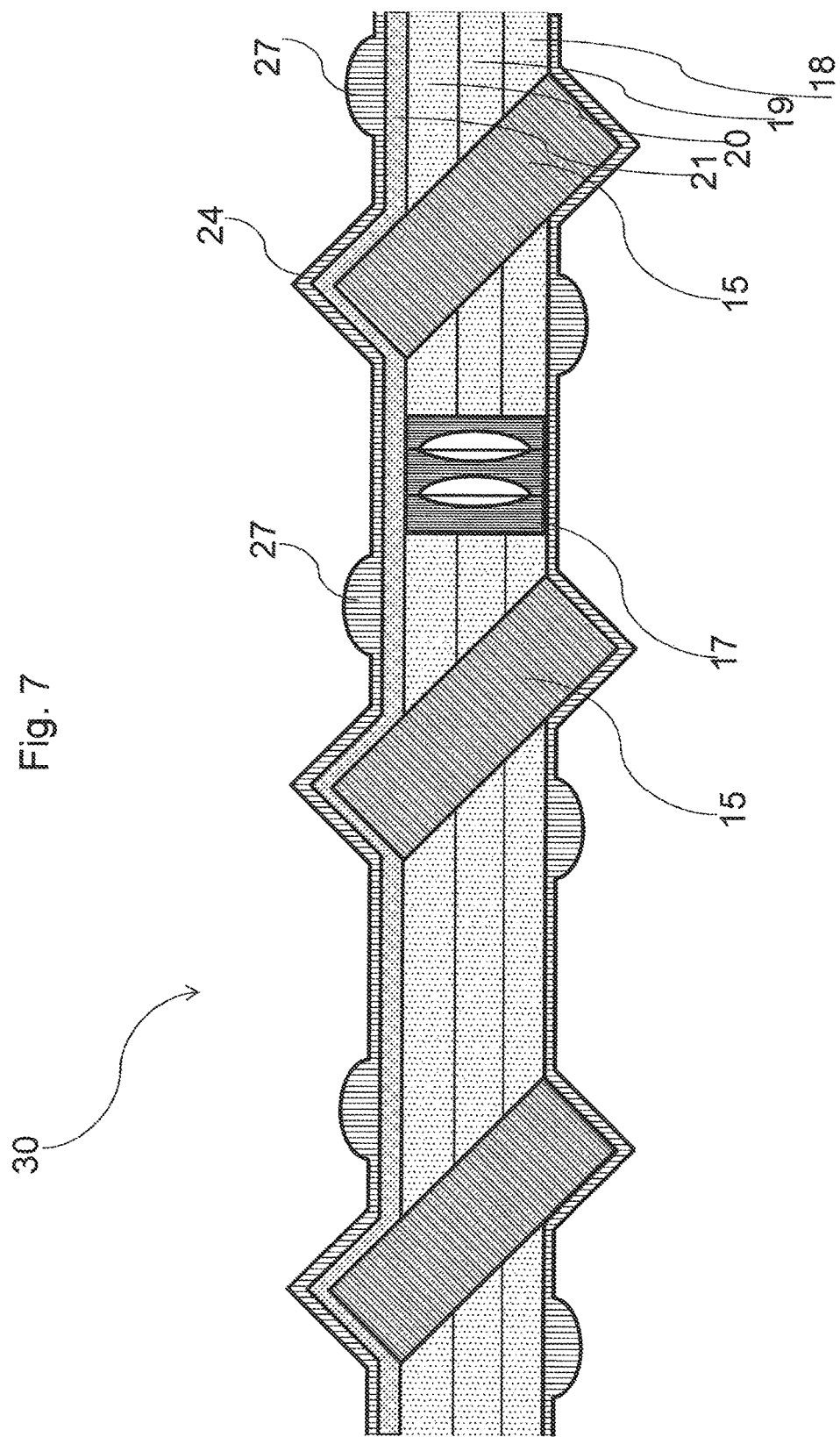
FIG. 7 shows another step of the present method for manufacturing an optical light guide element.

FIG. 7 shows the situation in which both mould 1 and mould 23 have been removed resulting in an array of optical light guide elements 30.

Figure 8:
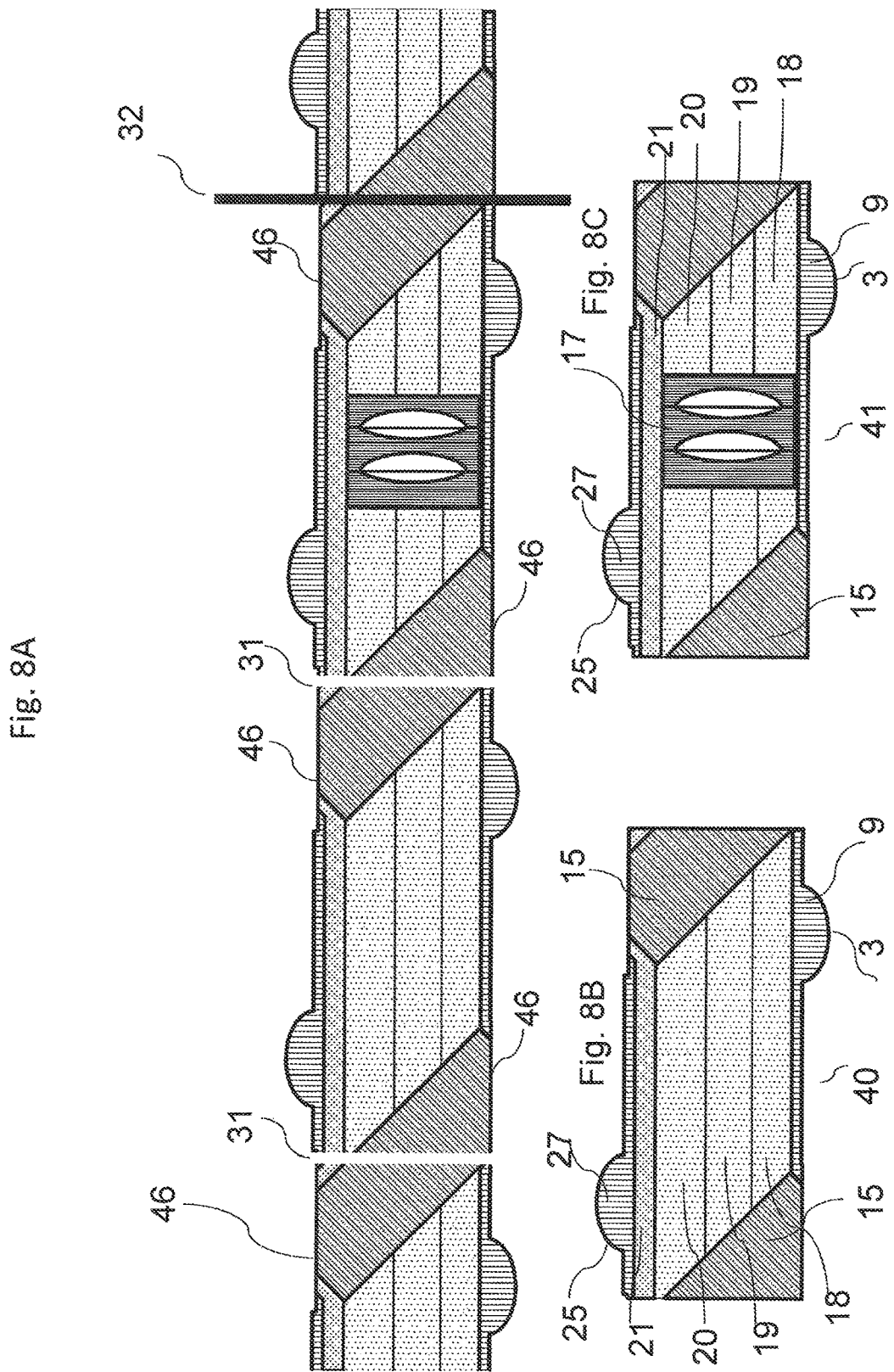
FIG. 8 shows another step of the present method for manufacturing an optical light guide element.

The excess or superfluous parts of optical mirror elements 15 can be removed by mechanical means, such as a dicing blade, resulting in the array of optical light guide elements having flat surfaces 46, as shown in FIG. 8A. FIG. 8A also shows a dicing blade 32 for singulating along dicing lines 31 of the array of optical light guide elements into individual optical light guide elements 40 (see FIG. 8B) and 4 (see FIG. 8C). Optical light guide element 40 (see FIG. 8B) comprises two optical mirror elements 15, lens 3 made of cured polymer 9, second cured polymer 18, 19, 20, cured polymer 21, lens 25 made of cured polymer 27. Optical light guide element 41 (see FIG. 8C) differs from optical light guide element 40 in the presence of optical element 17 in the area comprising second cured polymer 18, 19, 20. In another embodiment it is possible to further cut optical light guide element 40 into two complementary optical light guide elements by dicing through a dicing line (not shown) located in optical element 17, i.e. perpendicular to the outer surfaces where lenses 3, 25 are positioned. This embodiment will be further discussed in FIGS. 9A, 9B and 9C.

Figure 9:
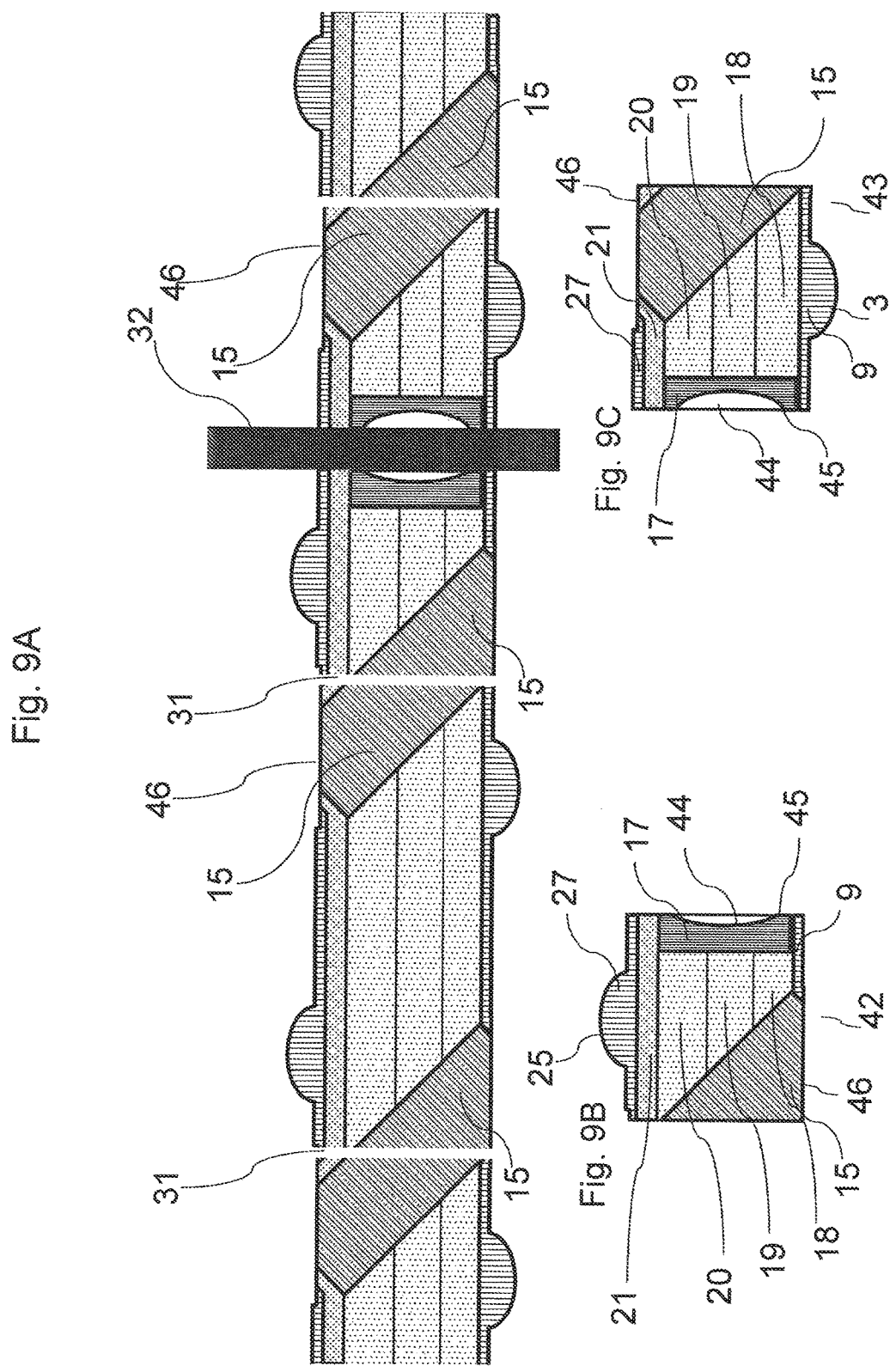
FIG. 9 shows another step of the present method for manufacturing an optical light guide element.

FIG. 9A shows another way of singulating along dicing lines 31 of the array of optical light guide elements into individual optical light guide elements 42 (see FIG. 9B) and 43 (see FIG. 9C). The dicing blade (see FIG. 9A) creates a cut through optical element 17 as shown in FIG. 9A thereby forming two optical light guide elements 42, 43. Optical light guide element 42 (see FIG. 9B) comprises one optical mirror element 15, a flat surface 46, second cured polymer 18, 19, 20, cured polymer 21, lens 25 made of cured polymer 27, and optical element 17, wherein optical element 17 comprises a smooth optical surface 44 recessed from dicing line and a rough dicing surface 45. Optical light guide element 43 (see FIG. 9C) comprises one optical mirror element 15, a flat surface 46, second cured polymer 18, 19, 20, cured polymer 21, lens 3 made of cured polymer 9, and optical element 17, wherein optical element 17 comprises a smooth optical surface 44 recessed from dicing line and a rough dicing surface 45. Such an optical light guide element 43 and optical light guide element 42 can be regarded as "two halves" of the optical light guide element 41 shown in FIG. 8C. Such an optical light guide element 41 comprises two inclined surface areas 15, i.e. one at the light entrance area and on at the light exit area, whereas optical light guide elements 42, 43 only comprise one inclined surface area, wherein the optical element 17 is perpendicular positioned to the lens 25, 3, respectively. Such optical light guide elements 42, 43 are compact elements.

Figure 10:
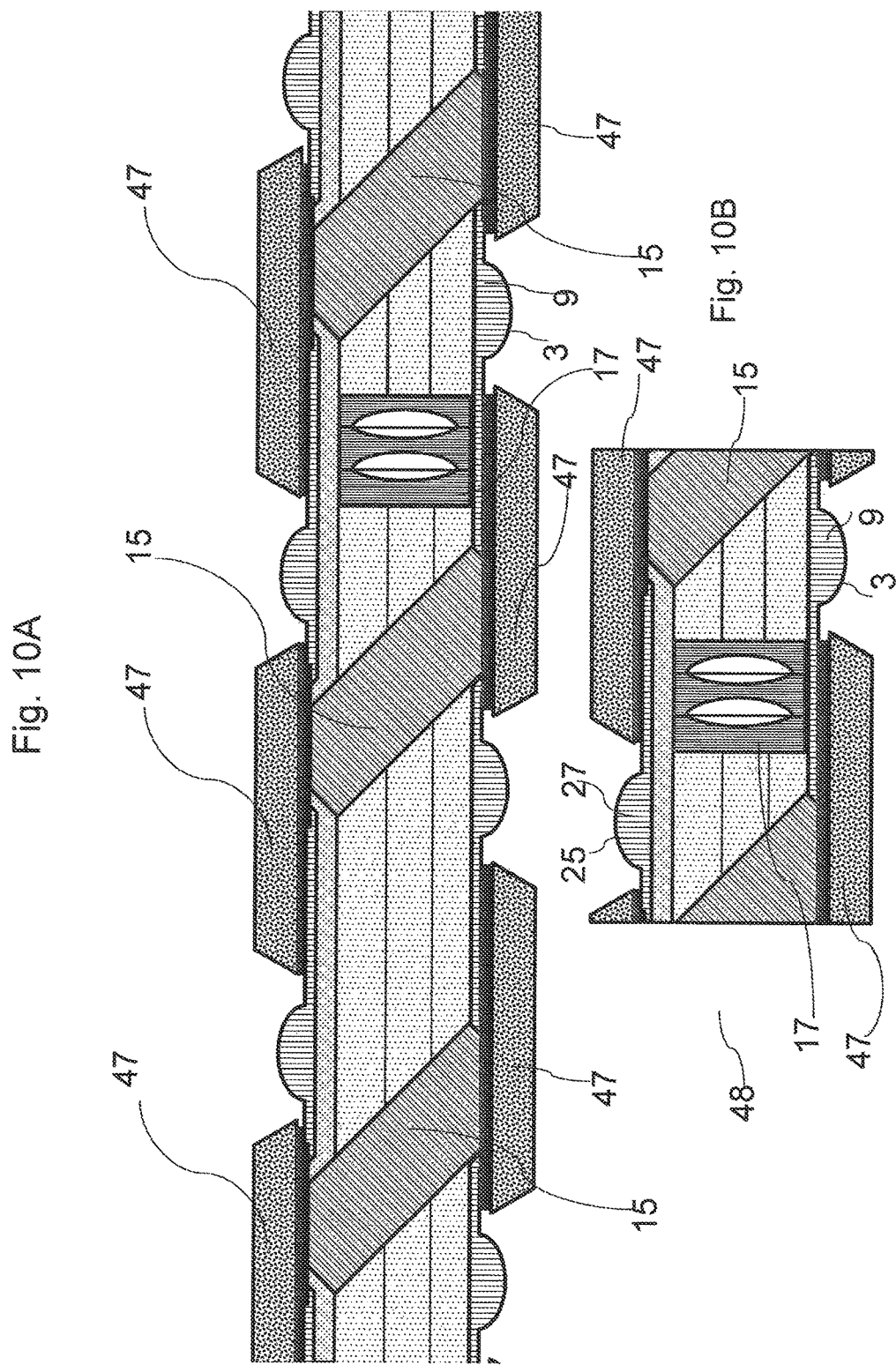
FIG. 10 shows another step of the present method for manufacturing an optical light guide element.

FIG. 10A shows an additional step in the method for manufacturing an optical light guide element, namely the XY reinforcement by positioning an additional substrate layer 47 on both sides of the array of optical light guide elements. An example of such a substrate layer 47 is bonded glass or FR4 substrate with regular spaces holes or openings. The array of optical light guide elements as shown in FIG. 10A can be diced into individual optical light guide elements 48 as shown in FIG. 10B.

Figure 11:
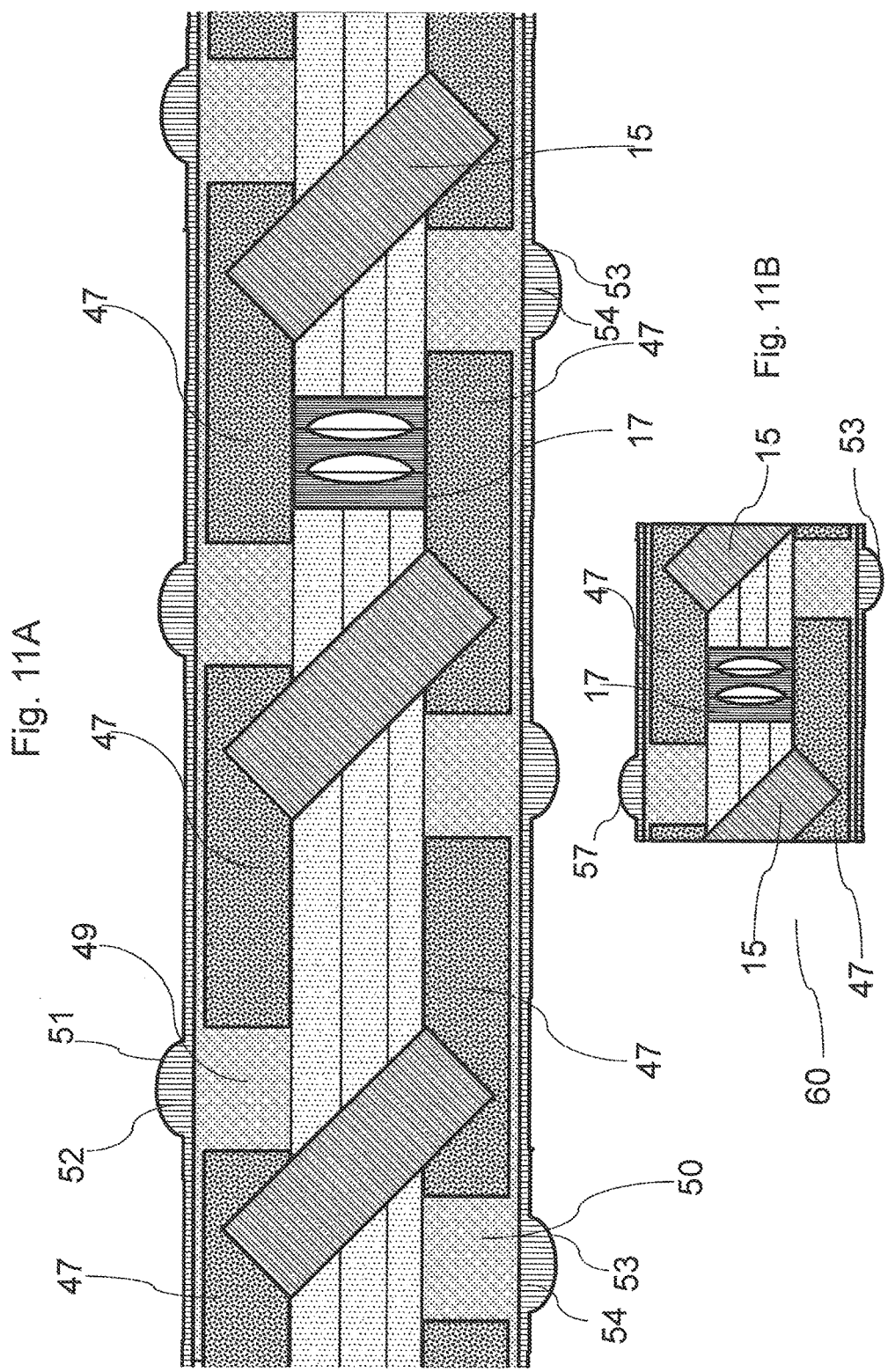
FIG. 11 shows another step of the present method for manufacturing an optical light guide element.

The XY reinforcement (see FIG. 11A) can be further improved by introducing liquid curable polymer into the openings or holes present in the substrate layer 47. After curing of this polymer 49 one or more lenses 51 can be replicated on top of the polymer layer 49. These lenses 51 are made of cured polymer 52. The array of optical light guide elements as shown in FIG. 11A can be diced into individual optical light guide elements 60 as shown in FIG. 11B.

Figure 12:
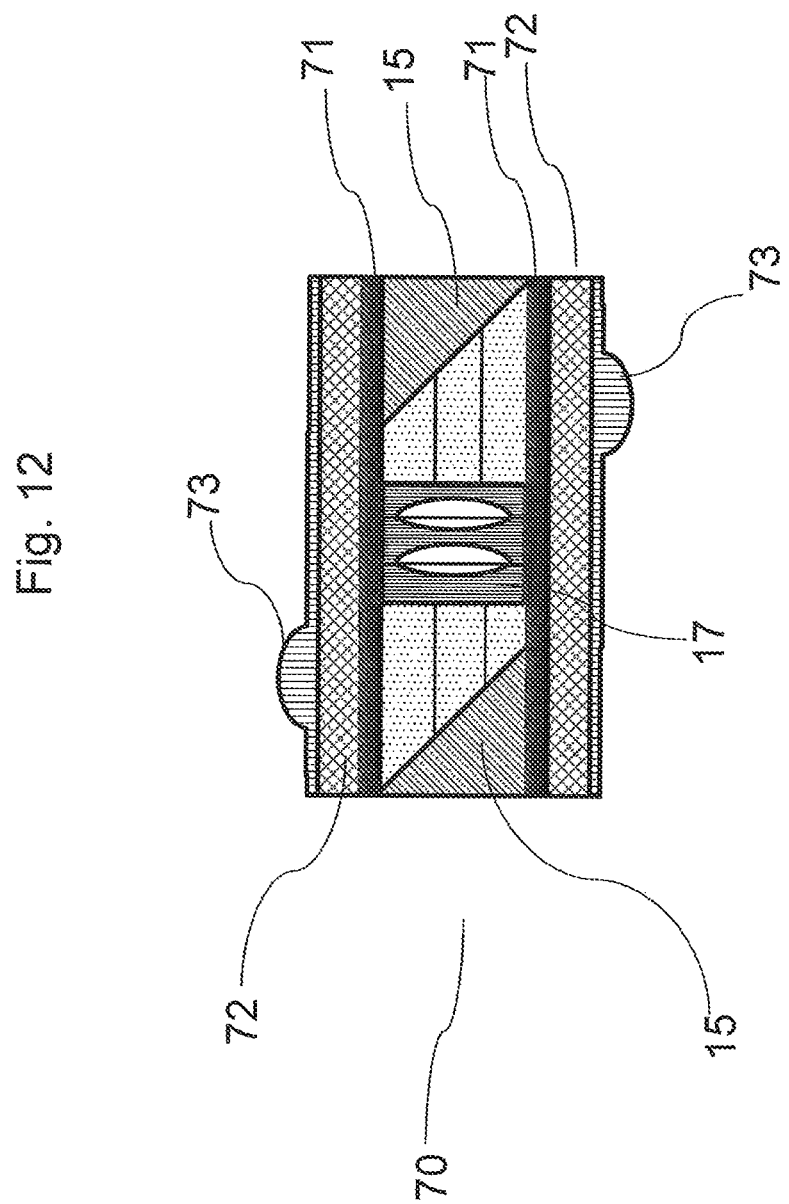
FIG. 12 shows another step of the present method for manufacturing an optical light guide element.

According to another embodiment the XY reinforcement can be further improved by the positioning of a glass wafer 72 on both sides of the array of optical light guide elements, and subsequently singulating the array thus manufactured into individual optical light guide elements 70 as shown in FIG. 12. Such a glass wafer may be bonded to the array of optical light guide elements by a bonding layer 71. In addition, the glass wafer 72 may comprise replicated features, such as lenses 73.

According to another preferred embodiment of the method for manufacturing an optical light guide element it is possible to replace the layers of second cured polymer 75 for a material that can be removed after completion of the manufacturing method. This means that in the optical light guide element as shown in FIG. 13, comprising cured polymer 75 located between wafer 72 and mirror elements 15, the cured polymer 75 is to be replaced during its manufacturing process by another type of material, such that material 75 can be removed, for example by dissolution or etching without damaging the interior optical surfaces of the optical element. The result of the removal of material 75 from the optical light guide element (shown in FIG. 13A) is the presence of air, indicated by reference number 74, as shown in FIG. 13B.

According to another embodiment it is preferred to use non-flat reflective surfaces (see FIG. 14A). FIG. 14A shows an embodiment in which a flat substrate is replaced for a substrate with replicated features enabling the creation of different types of reflective surfaces. In FIG. 14A a glass substrate 11 is provided on both sides with replicated lenses 81, 83. These replicated lenses 81, 83 may be provided with one or more coatings 82, 84, such as reflective coatings. The substrate shown in FIG. 14A can be diced along specific dicing lines for obtaining individual reflective elements, i.e. optical mirror elements 15. Analogy to the method as disclosed here for FIG. 3 these curved optical mirror elements 5 may replace one or more of the optical mirror elements as shown in any of the previous figures shown here. FIG. 14B shows an optical light guide element 80 comprising concave mirrors resulting from replicated lenses 81, 83, lenses 86, 85, optical element 17 embedded in cured polymer.

FIG. 15A, 15B, 15C show three examples wherein mirror surfaces are placed at different angles. FIG. 15A shows incoming light ray 105, outcoming light ray 106 and the main direction of light propagation within the optical light guide element 100. Mirror surfaces 101, 102 are placed such that light ray 105 enters the top of the optical light guide element 100 and leaves it at the underside thereof. In the optical light guide element 110 as shown in FIG. 15B mirror surfaces 101, 103 are placed such that light ray 105 enters the top of the optical light guide element 100 and leaves it at the top as well. In the optical light guide element 120 as shown in FIG. 15C mirror surfaces 101, 104 are placed such that light ray 105 enters the top of the optical light guide element and leaves it at the front side thereof.

FIG. 16. shows a specific embodiment of an optical light guide element according to the present invention, i.e. spectrum analyser 90. Incoming light 94 enters the optical light guide element 90 at the top and is reflected by optical mirror 15. The light propagates within the optical light guide element through three beam splitters 91, 92, 93 and a part of the light is reflected on optical mirror 15. In each beam splitter 91, 92, 93 a part of the incoming light is reflected and directed, via gratings 96, 97, 98, respectively, onto a detector 95. According to such a specific embodiment of the present optical light guide element it is possible to divide the incoming light 94 into different parts.

The invention claimed is:

1. An optical light guide element having a first end section with a light entrance area designed for facing a light source and having a second end section with a light exit area designed for facing a light target area, wherein the light exit area is defined by a second surface area on the optical light guide element which faces a light target area, and wherein the light entrance area is defined by a first surface area on the optical light guide element which faces the light source, wherein the first end section comprises a first inclined surface area which forms an acute angle with the first surface area of the light entrance area, wherein the second end section forms a second inclined surface area which encloses an acute angle with the surface area of the light exit area, characterized in that said first surface area on the optical light guide element which faces the light source comprises a first replicated polymer lens, said first inclined surface area and said second inclined surface area both comprise a substrate provided with a reflective surface;
  wherein said substrate of said first inclined surface area comprises glass, and wherein said substrate of said second inclined surface area comprises a glass;
  wherein said second surface area on the optical light guide element which faces a light target area comprises a second replicated polymer lens,
  wherein the material for the first and second replicated polymer lens differs from the cured transparent polymer material used for the volume between said first end section and said second end section.

2. A method for manufacturing an optical light guide element according to any one or more of the preceding claims, the method comprising the steps of:
  i) providing a first mould provided with a first mould surface having a plurality of lens shapes and recesses;
  ii) providing a first liquid curable polymer on top of said first mould surface of said first mould;
  iii) providing a second mould provided with a second mould surface having a plurality of ribs;
  iv) contacting said first mould with said second mould such that the first liquid curable polymer spreads into the plurality of lens shapes and recesses and that said ribs of said second mould fit into said recesses of said first mould;
  v) curing said first liquid curable polymer for obtaining a first mould provided with a layer of cured first polymer, and removing said second mould;
  vi) positioning a plurality of optical elements into said recesses of said first mould provided with a layer of cured first polymer;
  vii) providing a second liquid curable polymer in the area between said positioned optical elements;
  viii) curing said second liquid curable polymer;
  ix) providing a third liquid curable polymer on top of said layer of cured second polymer;
  x) contacting said third liquid curable polymer with a third mould provided with a third mould surface having a plurality of lens shapes and recesses;
  xi) curing said third liquid curable polymer and removing said first and third mould for obtaining an array of optical light guide elements; and
  xii) singulating said array of optical light guide elements.

3. A method according to claim 2, wherein before contacting said third liquid curable polymer with said third mould an additional step is carried out, namely the preparation of such a third mould, comprising providing a third mould provided with a third mould surface having a plurality of lens shapes and recesses, providing a fourth liquid curable polymer on top of said third mould surface of said third mould, providing a second mould provided with a second mould surface having a plurality of ribs, and contacting said third mould with said second mould such that the fourth liquid curable polymer spreads into the plurality of lens shapes and recesses and that said ribs of said second mould fit into said recesses of said third mould, and removing said second mould.

4. A method according to claim 2, wherein between step iii) and iv) an additional step is carried, namely a step of placing a foil between said second mould surface having a plurality of ribs of said second mould and said first liquid curable polymer on top of said first mould surface of said first mould.

5. A method according to claim 2, wherein step vi) further comprises positioning one or more optical elements onto said layer of cured first polymer between said plurality of optical light guide elements, wherein said one or more optical elements are chosen from the group of lenses, infra red filter, diaphragm, aperture, beam splitter, polarizer and dichroic filter.

6. A method according to claim 2, wherein step vii) further comprises the gradual provision of said second liquid curable polymer in the area between said positioned optical elements, wherein the gradual provision preferably comprises the application of a layer of second liquid curable polymer and partially curing said second polymer and the application of one or more additional layers of second liquid curable polymer and partially curing the same.

* * * * *